April 5, 1966 K. W. SKOGLUND 3,244,426

PERCUSSION DRILLS

Filed March 5, 1962

INVENTOR

KARL W. SKOGLUND

BY *Mason, Porter, Diller & Brown*

ATTORNEYS

United States Patent Office 3,244,426
Patented Apr. 5, 1966

3,244,426
PERCUSSION DRILLS
Karl Waldemar Skoglund, Hagfors, Sweden, assignor to Uddeholms Aktiebolag, Uddeholm, Sweden, a joint-stock company of Sweden
Filed Mar. 5, 1962, Ser. No. 177,491
2 Claims. (Cl. 279—19)

The present invention relates to improvements in percussion drills of the type comprising a collar and a shank end portion, and more especially to percussion drills of this type having an upset or forged collar. A very severe disadvantage of such drills has hitherto consisted in that the portion of the shank close to the collar very often shows fatigue failures and even breakages due to the impacts or shocks imparted to it by the drill sleeve or chuck. These fatigue breakages or fractures have caused discarding of percussion drills long before their normal life time has ended and also many bad accidents, the drill operator being badly injured. Particularly destructible are the corners at the concave moldings or fillets of drill shanks with polygonal cross-section forms.

Another drawback exists in that the wear has been very considerable just in this very same place or points. Between the drill shank and the chuck there must obviously be a sufficient play in order to guarantee free reciprocating movements of the drill, and this play has, of course, allowed the drill to occupy a more or less oblique position relative to the drill sleeve or chuck. When the chuck strikes against the drill in such oblique or distorted positions the place of contact between the collar and the chuck has an extremely small area, and the local stress is accordingly very high, causing the above-mentioned fatigue breakages and great wear.

A still further disadvantage has resulted from forming the drill chuck in accordance with the usual rounded concave molding or fillet between the drill shank and the collar. The required rounding of the corresponding end of the chuck has usually been made by hand, as the polygonal, usually hexagonal, cross-section form of the shank and the hole of the chuck has made this work too complicated to be performed by machines. This manual work has been very time consuming and expensive.

The present invention has for its object to eliminate the above disadvantages and to provide a device or arrangement which brings about a very considerably increased strength and a practically total elimination of the fatigue breakages and further such a reduction of the wear that the lifetime will be at least twice as long as the hitherto usual life time with normal wear, and that the said troublesome manual work may be replaced by comfortable and rapid machine work, and further that the danger of accidents will be eliminated.

The device according to the invention is characterized in that the drill shank and the chuck embracing the shank have complementary circular, preferably conical, cylindrical or annular portions or parts.

The circular portions have a diameter which is approximately equal to or greater than the greatest (circumscribed) diameter of the polygonal cross-section.

Practical trials have shown that these features of the invention produce a most efficient guidance of the drill to a straight and correct contact with the chuck, so that the chuck end will strike against the collar with a perfect uniformity and evenness. Hereby the wear is reduced most surpisingly, and the like of the shank as well as of the chuck has been doubled.

The circular form provides that the portion close to the collar is stronger and smoother, and trials have proved that the drills according to the invention are completely free from the hollow moulding breakages hitherto so troublesome. In respect of usual rock drills one has to reckon with an increase of about 80 square millimeters of the cross-sectional area of the drill shank.

The length of the circular portion should suitably not exceed one half of the length of the shank. In rock drills this means a practical length of 10–50 mm. or preferably 10–20 mm. The angle of the cone is 2–20°, preferably 6–20° or preferably about 10°.

The circular portions may be produced by forging or the like, the upsetting tools being formed according to the principle of the invention. The chuck may likewise be produced by forging or machining, e.g. through turning and/or grinding.

The outer diameter of the collar may be chosen slightly greater than what has hitherto been employed relative to the dimensions of the drill rod material.

The formerly very troublesome polygonal form of the drill rod and the chuck close to the collar is eliminated, and this circumstance certainly contributes to the elimination of the fatigue cracks.

The above-mentioned play between the shank and the chuck should be present also in the device according to the invention in respect of the prismatic parts of the shank and the chuck while the play between the two circular cooperating portions should be smaller and approximately nil, thereby ensuring an exact guidance of the drill rod in the chuck when the impact end of the chuck is approaching the collar.

The nature of this invention is further explained through the embodiments shown in the accompanying drawings as examples of the principle of the invention.

Figure 1:
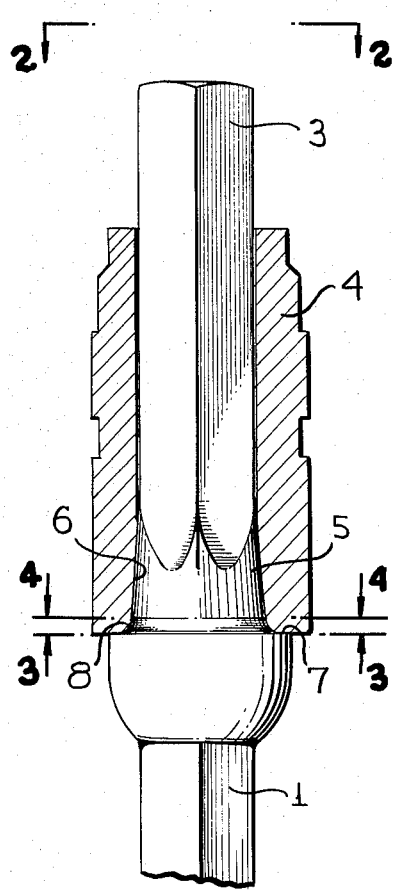
FIGURE 1 is an elevation view, partly in section, of the shank and the collar portions of a percussion rock drill constructed in accordance with the invention and illustrating a chuck or drill sleeve placed in position on the shank.
Figure 2:
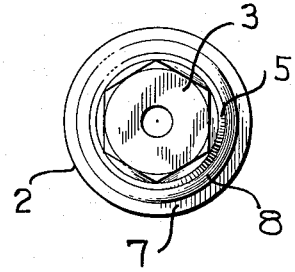
FIGURE 2 is a plan view of the shank, taken on the line 2—2 of FIGURE 1.
Figure 3:
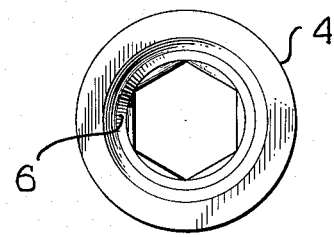
FIGURE 3 is a view of the chuck or sleeve, taken on the line 3—3 of FIGURE 1, with the drill rod removed.
Figure 4:
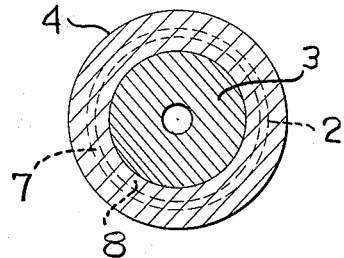
FIGURE 4 is a cross-sectional view taken on the line 4—4 of FIGURE 1.

I designates the drill rod, 2 its collar and 3 its shank or neck, while 4 designates the chuck abutting on the collar.

The drill rod has the usual hexagonal cross-section, the invention being, however, applicable on any other cross-sections.

According to the principle of the present invention the shank 3 and the chuck or sleeve 4 have complementary conical or tapering portions 5 and 6, respectively, which have substantially the same cone angle and diameter. The cone, bevel or taper angle may be 2 to 20°, preferably 6 to 12° or about 10° for example.

As indicated in FIG. 1, the base or widest portion of the conical portion has a diameter which is approximately identical with or slightly greater than the greatest cross-sectional diameter of the hexagonal drill rod, and this base is situated near or close to the collar 2. Thus the form of the drill shank close to the collar is circular and even, without any edges. This is quite different from all hitherto known percussion rock drills in which the edges of the hexagonal form reach the collar and form kerfs or indications of fractures at this very severely stressed place. The chuck 4 has the corresponding circular, even and smooth form at its end close to the collar.

The conical formations coact effectively by ensuring, at each movement of the chuck or sleeve 4 along the shank 3, that the abutment surfaces of the collar and the chuck will hit each other straightly and exactly, so that the impact will be distributed over the whole circumference of the collar 2 as well as of the chuck 4. The wear will accordingly be a minimum and the life of the drill and the chuck a maximum, proved by practical trials. The trials have also provide that the fatigue cracks and fractures are almost wholly eliminated. The reason is the absence of fracture indications, since there are no longer dangerous edges on the exposed parts, and the said abutment is uniform and even between the contact surfaces.

The considerably increased life effects a very important economical saving which is indirectly increased by the reduction of the waste time through the increased time intervals between the drill exchanges.

Between the fully hexagonal portions of the shank 3 and the chuck 4 there is in a known way a certain play in order to allow for the reciprocating movement of the shank in the chuck. Between the conical portions 5 and 6 of the shank and the chuck, respectively, there should in FIG. 1 suitably be a considerably smaller play which possibly can be reduced until approximately nil, whereby exactly the wanted central positions and directions will be achieved between the cooperating parts.

The length of the conical portions (reckoned from the beginning on the side surfaces of the hexagonal form to the annular impact surface 7 of the collar) should be not more than one half of the length of the shank, i.e. in practice mostly ten to 50 mm., for example ten to 20 mm.

The rounded or circular form of the cone base is connected through a rounded concave moulding or fillet 8 to the annular impact surface 7 of the collar 2. As is clearly shown in FIGURE 1, the fillet 8 extends along the axial length of the drill rod 1 only a very slight distance, while the conical portions 5 and 6 of the shank and chuck, respectively, extend axially of the drill rod 1 a distance substantially greater in length than the axial length of the fillet 8. The outer diameter of the collar may have greater dimensions than heretofore relative to the dimensions of the hexagonal form. This does not involve any disadvantages, since there is ample space for this enlargement in the drill machines in front of the chuck.

In use the conical forms of the collar and the shank will be further fitted to each other, and the wear resisting surface will be very large. In the known drills the surface is rather small, the wear taking place, to a great degree, near the cams of the hexagonal form and along the front surface of the collar.

The detrimental oblique positions mentioned in the opening part of this description are completely eliminated through the gradual but effective conformity between the shank and the tapering portions of the chuck.

In the embodiment shown in FIGURES 1, 2, 3 and 4 there is a concave moulding or fillet 8 between the cone portion of the shank and the collar 2. This embodiment may be modified by omitting the concave moulding or fillet, whereby the impact surface is considerably enlarged without changing the outer diameter of the collar 2.

The round portions of the disclosed embodiment may be produced by diecasting, turning, grinding or forging.

It should be understood that the invention is not restricted solely to the embodiment described and shown here, since many other embodiments are possible within the scope of the invention. Thus, the invention is not limited to drills with only one drill rod as it is applicable on drills with an arbitrary number of rods coupled together, and generally on all percussion drills with neck or shank and collar portions, e.g. drills with detachable collars and/or shanks.

The round portions need not necessarily be situated close to the collar or the end of the chuck sleeve, as they may be placed in other places. It is also possible to construct embodiments with more than one round portion; such a plurality of round portions may be distributed along the length of the shank and the chuck sleeve.

The cone angle of the described embodiment may vary along the lengths of the conical portions, e.g. so that the angle is increasing towards the collar and/or so that the cone angle at the end of the cone remote from the collar is approximately nil. Hereby the guiding action will be still smoother.

I claim:

1. In combination, a percussion drill rod and a chuck, said drill rod comprising a shank of generally polygonal cross-section and a collar having an annular impact surface extending around said drill rod, said annular impact surface being on the side of said collar toward said shank, said chuck surrounding said shank and being movable relative thereto along the longitudinal direction of said drill rod, said chuck having an annular impact surface cooperating with the annular impact surface on said collar, said chuck having a polygonal opening therein for cooperating with the shank, said shank and chuck having mutually corresponding conical portions with round cross-sections and acute cone angles, the bases of said conical portions being adjacent the respective annular impact surfaces and having a diameter which is greater than the greatest diameter of the polyognal cross-section of said shank, the conical portion of said drill rod being connected to the impact surface of said collar by a concave fillet, said conical portion of the drill rod having a substantially greater axial length than the axial length of said concave fillet.

2. In the combination as defined in claim 1, the conical portion of said chuck being connected to the annular impact surface of said chuck by a rounded portion which is complementary to said concave fillet.

References Cited by the Examiner
UNITED STATES PATENTS

| | | | |
|---|---|---|---|
| 1,126,628 | 1/1915 | Gilman | 279—19.5 X |
| 1,796,487 | 3/1931 | Stevens | 279—19 |
| 1,817,591 | 8/1931 | Slatcher | 279—19.7 |
| 1,831,818 | 11/1931 | McKenny | 279—19.1 |
| 1,834,945 | 12/1931 | Hafford | 279—19.1 |
| 2,477,054 | 7/1949 | Gartin | 279—19.3 |
| 2,817,316 | 12/1957 | Ekstrom | 279—19.1 |
| 2,958,534 | 11/1960 | Fuehrer | 279—19.1 |
| 3,042,004 | 7/1962 | Fischer | 279—19 |

FOREIGN PATENTS

| | | |
|---|---|---|
| 354,562 | 6/1922 | Germany. |
| 346,217 | 4/1931 | Great Britain. |

ROBERT C. RIORDON, *Primary Examiner.*

RALPH H. BRAUNER, LESTER M. SWINGLE,
*Examiners.*

H. V. STAHLHUTH, *Assistant Examiner.*